United States Patent
Yoshida et al.

[15] 3,660,000
[45] May 2, 1972

[54] APPARATUS FOR THE CONTINUOUS MANUFACTURE OF CORRUGATED PLASTIC PIPES BY EXTRUDING

[72] Inventors: Tsunemi Yoshida, Tokyo; Koichi Ishikawa; Masatoshi Ando, both of Yokohama; Yoshihiko Ueno, Kawagoe; Kunio Arisawa, Yokohama, all of Japan

[73] Assignee: The Furukawa Electric Company Limited, Tokyo, Japan

[22] Filed: Sept. 9, 1969

[21] Appl. No.: 871,107

Related U.S. Application Data

[62] Division of Ser. No. 624,584, Mar. 20, 1967, Pat. No. 3,529,047.

[30] Foreign Application Priority Data

Mar. 26, 1966 Japan...................................41/18601

[52] U.S. Cl..............................425/327, 425/380, 425/378, 425/393, 425/396
[51] Int. Cl.....................................B29d 23/04
[58] Field of Search ....................18/14 Q, 13 Q, 13 T, 14 A, 18/14 R, 14 RR, 13 RR, 19 TC; 264/90, 124

[56] References Cited

UNITED STATES PATENTS

| | | | |
|---|---|---|---|
| 2,702,410 | 2/1955 | Brown | 18/12 |
| 3,306,962 | 2/1967 | Pepper | 264/90 |
| 3,346,921 | 10/1967 | Bunish | 18/14 |

Primary Examiner—J. Spencer Overholser
Assistant Examiner—Norman E. Lehrer
Attorney—Stevens, Davis, Miller & Mosher

[57] ABSTRACT

An apparatus for continuous manufacture of helically corrugated plastic pipe from extruded tubing utilizing differential pressure. Thermoplastic material is extruded in a molten state in the form of a tube and the tube is passed over a helically corrugated surface of either an internal mandrel or an external mandrel. A vacuum is supplied between the surface of the cylindrical body and the inside surface of the tube to conform the tube to the surface of the body. A pressure differential is maintained inside the formed pipe, a vacuum being used with the internal mandrel and a pressure with the external mandrel. The cylindrical body is rotated to advance the extruded tube formed thereabout and a cooling fluid is circulated through the cylindrical body to cool the tube as it it formed against the body.

5 Claims, 11 Drawing Figures

PATENTED MAY 2 1972 3,660,000

APPARATUS FOR THE CONTINUOUS MANUFACTURE OF CORRUGATED PLASTIC PIPES BY EXTRUDING

This is a divisional application of my co-pending application Ser. No. 624,584, filed Mar. 20, 1967 now U.S. Pat. No. 3,529,047.

This invention relates an apparatus for producing in a continuous manner helically corrugated plastic pipes of thermoplastic materials such as polyethylene, polypropylene and ethylene propylene copolymer, polystyrene, polycarbonate, polyvinyl chloride, ethylene vinyl acetate copolymer, fluorine contained resin and polyamide resin, and moreover relates to helically corrugated plastic pipes with high flattening strength combined to high flexibility.

A typical known practice for producing relatively thin wall corrugated pipes, i.e. transversely grooved tubing, is the so-called mould process, that is, corrugated tubing may be produced by placing a tube of uncured plastic material within corrugated mould, applying suitable amount of heat to the plastic material, introducing air under pressure into the interior of the tube to expand the tube into intimate contact with the corrugated surfaces of the mould, and thereafter, removing the tube having the corrugated configuration from the mould and curing it. Other such practice is vacuum moulding process, that is, corrugated tubing may be produced by placing or extruding a tubing of plastic material on a corrugated forming tube having many small holes, extracting air in the forming tube to compress the tubing into intimate contact to the forming tube.

These and other similar batch type techniques, are cumbersome, laborious, and inefficient. Further, as the finished tube length is limited by the length of the mould, it is necessary for a fabricator to have on hand a great number of different size moulds in order to meet demands for various lengths and diameters of tubing. Consequently, the batch process includes serious disadvantages including limitation of tube length, high capital costs in addition to high labor costs.

More recently, blow moulding techniques were introduced to produce corrugated tubing in a continuous manner. The known process involves the use of two conveyor assemblies located one above the other in a vertical plane, which continuously carry matching pairs of mould halves of segments in front of the orifice of an extrusion die. In this manner, a tube of hot plastic material leaving the extrusion die is deposited between a matching pair of mould segments which move, on the respective conveyor belts, in front of the die orifice. As the mould halves move toward the die orifice on the respective conveyor belts, they are caused to close to form the desired article. Thereafter air or other fluid is introduced through an appropriate opening in the extrusion die to cause the hot, soft plastic tube leaving the extrusion die to conform to the configuration of the matching mould segments.

Although the above mentioned blow moulding system is capable of producing corrugated tubing in a continuous manner, the process involves several disadvantages, one of which is the rapid accumulation of heat from the hot extruded plastic pipe to the moulds. Blow moulding technique requires relatively high extrusion temperature, i.e. about 180° C. to polyethylene tube, in order that the plastic extrusion composition may be mobile and capable of responding to relatively low blow moulding fluid pressure. At low temperature, the fluid pressure required to lay or blow the plastic composition against the mould surfaces increases markedly, and nevertheless the plastic composition does not faithfully conform to the mould surface. Consequently, a reduction in the amount of heat to be dissipated from the mould may not be obtained by the use of lower moulding temperature. Conversely, when a higher extrusion temperature is utilized without adequate cooling of the mould sections, the heat prevents sufficient setting of the plastic material, so that the tubes leaving the blow moulding system will not be self-supporting. Accordingly they tend to be in capable of retaining the desired shape imposed by the mould, and to collapse, which may cause large production losses.

The required dissipation of heat in known batch moulding systems may be effected in a relatively simple manner, by providing the mould with internal passage for the circulation of cooling fluid, because the mould is nearly stationary. However, in the continuous blow moulding system, the adaption of internal circulating fluid cooling passage is extremely difficult, because the mould sections necessarily consist of many articulated parts opening and closing and constantly travelling.

For this reason continuous blow moulding system necessarily aim at cooling the mould surfaces externally. In those systems in which the matching mould halves are arranged on conveyor chain or belts, the surfaces exposed to the atmosphere are limited to the sides and ends of the moulds, because the bases of the mould halves are secured to the respective runs of the conveyor. Where the distances between adjacent mould parts are small, the ability of the end surfaces to dissipate heat is severely reduced, and, as a practical matter, only the sides of the moulds are available for effective heat dissipation.

One technique to obtain adequate cooling effect may be lengthening the operation cycle between the time the mould halves grasp the tube leaving the extrusion die orifice, firmly close and then open to eject the article. This technique is not a desirable solution, because it serves to reduce the output of the machine and thereby defeats one of the major advantages of continuous blow moulding. An alternative of reducing the speed of the continuous blow moulding machine resides in lengthening the runs of conveyors upon which the moulds are mounted. In this way, overall lengthening of the machine results in increased capital costs, increased maintenance charges and greater likelihood of breakdown because it causes a substantial increase of number of parts which require precision adjustment.

It is a primary object of the invention to provide a method to produce at a higher rate and in a continuous manner a helically corrugated plastic tubing of infinite length having uniform wall thickness and uniform configuration. The method according to the invention, mitigates the problems and difficulties of known continuous blow moulding systems, and includes advantages of producing continuously and efficiently helically corrugated plastic pipes of infinite length having uniform wall thickness and uniform configuration of required size.

It is another object of the invention to provide an apparatus to produce helically corrugated plastic pipes having uniform wall thickness and uniform configuration at a higher rate, by extruding hot plastic pipe continuously by an extruder on the forming body comprising rotating forming cylindrical body having helically corrugated forming surface, and including passages of cooling medium, and contracting and conforming the pipe to the forming body by evacuating air from the space between the hot plastic pipe and the forming body, and then cooling the conformed pipe by heat dissipation through forming body. Such method is termed as "inside mandrel system" in the specification.

Another object of the invention is to provide an apparatus to produce helically corrugated plastic pipes having uniform wall thickness and uniform configuration, by extruding hot plastic pipe continuously by an extruder to inside surface of the forming body, comprising rotating cylindrical body having internally helically corrugated surface, and expanding the pipe to conform the surface of the forming body by extracting air from the space between the hot plastic pipe and the forming body, and by inducing compressed air in the plastic pipe, and then cooling the conformed pipe by heat dissipation through forming body. Such method is termed in this specification simply as "outside mandrel system."

Another object of the invention is to provide a helically corrugated plastic pipe having such high mechanical strength that the flattening strength is 1 ton/meter or over at 20 percent deformation while the flexural rigidity is not more than 30 kg-$m^2$ which is conveniently used for ducts of underground electric cable.

A further object of the invention is to provide an apparatus for manufacture of underground electric cable provided with helically corrugated plastic ducts suitable for burying underground directly.

The invention involves a method for manufacture of helically corrugated plastic pipes, characterized in that a hot molten tubular material of substantially thermoplastic material extruded from an extruder is compressed to a helically corrugated surface of a rotating cylindrical body disposed at the forwarding position of the extruding die by applying a pressure difference between outer and inner surfaces of the tubular material so as to conform the tubular material to the surface of the cylindrical body and is fed forward by the rotation of the body while being cooled and solidified. This invention involves particularly an apparatus to produce corrugated plastic pipes by means of inside mandrel system in which; on a helically corrugated forming surface of a cylindrical body having a part of the outer surface helically corrugated by desired length and having inside passages for cooling medium, and disposed to project said forming surface from a die in through a nipple and the die of cross head of said extruder and rotatably driven by driving means through the other end thereof, a hot molten tubular thermoplastic material is extruded from the extruder and contracted and conformed to the helically corrugated forming surface by a pressure difference between outer and inner surfaces of said tubular material and is fed forward by the rotation of the forming cylindrical body, and by means of outside mandrel system in which on a helically corrugated forming inner surface of a forming cylindrical members having disposed in forward position of die secured to a cross head of the extruder and rotatably driven by driving means, a hot molten tubular plastic material is extruded from the extruder and the outer surface thereof is expanded and conformed to the helically corrugated forming surface by a pressure difference between outer and inner surfaces and is fed forward by the rotation of the forming member. The invention also includes a helically corrugated plastic pipe having flattening strength of 1 ton/meter at 20 percent deformation, while flexural rigidity is not more than or over 30 kg-m$^2$.

Other objects, features and advantages will become obvious from the following detailed descriptions of the preferred embodiments, by way of examples, and accompanying drawings, in which;

FIG. 4a is an embodiment of assembled apparatus shown in FIG. 1 and FIG. 2 associated with production of helically corrugated plastic pipe;

FIG. 4b is a sectional view along line A—A of FIG. 4a;

FIG. 5a is a sectional view of another embodiment of the inside mandrel system associated with production of plastic duct containing cable;

FIG. 5b is a sectional view along line A—A of FIG. 5a;

Figure 1:
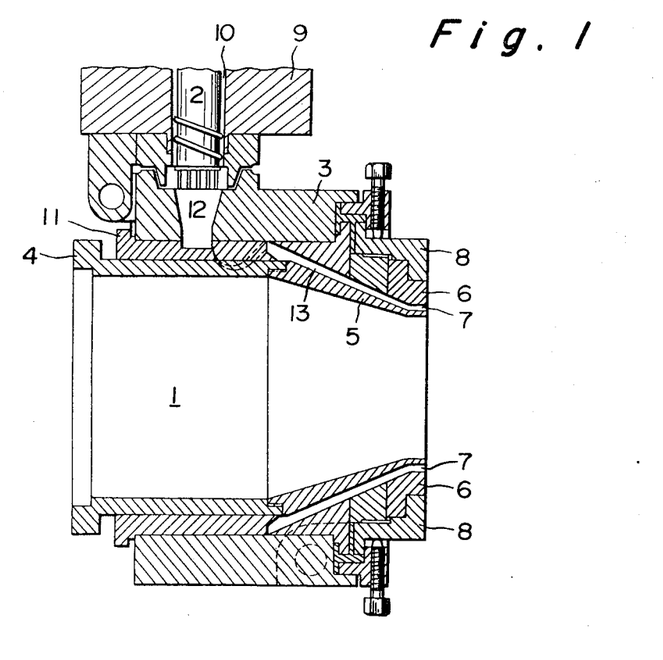
FIG. 1 is a longitudinal sectional view of a cross head of one embodiment according to the invention of corrugated plastic pipe producing apparatus.
Figure 2:
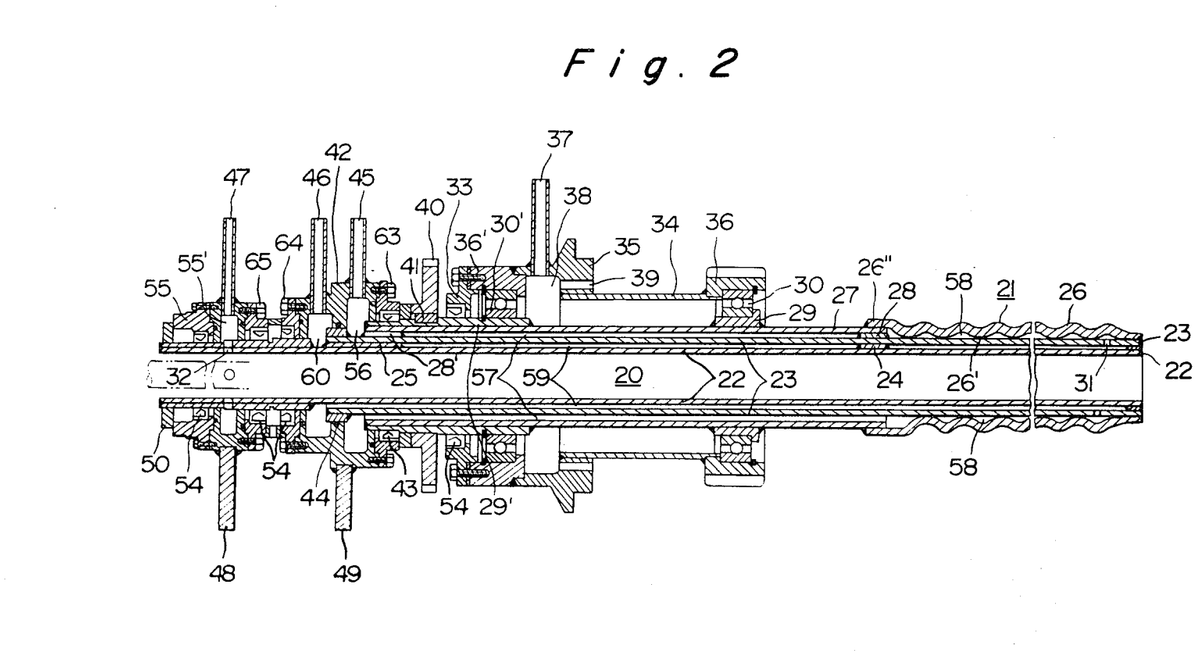
FIG. 2 is a longitudinal sectional view of a forming cylindrical body to be inserted in the cross head shown in FIG. 1.
Figure 3:
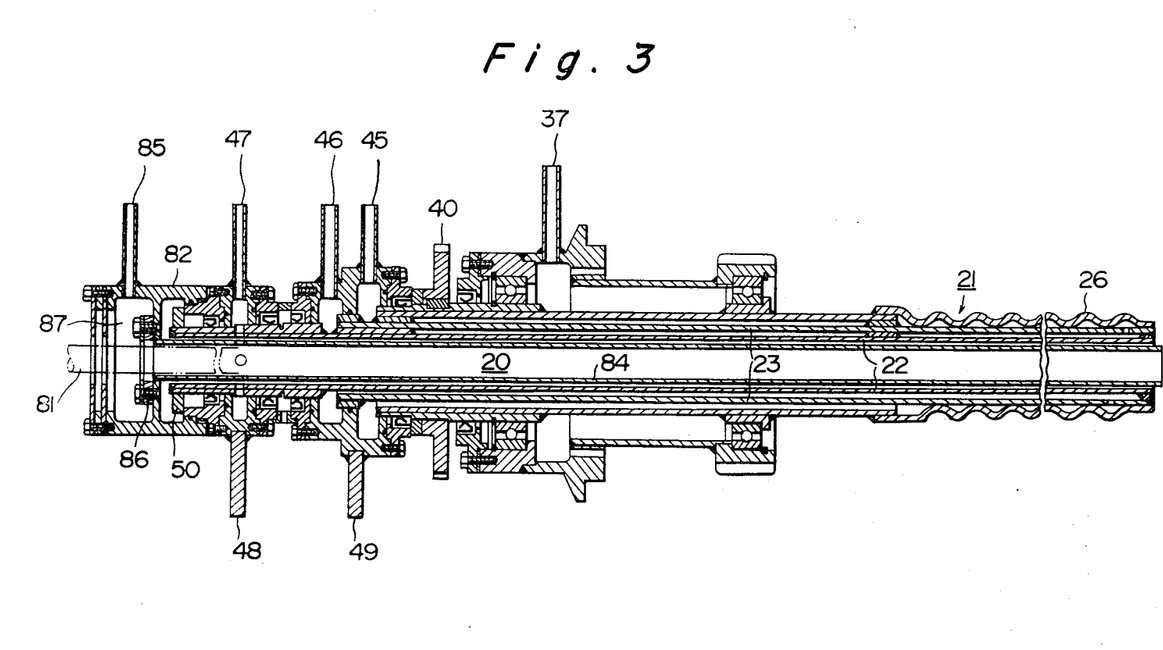
FIG. 3 is a longitudinal sectional view of a forming cylindrical body to manufacture corrugated plastic duct in which cable is contained.
Figures 4A, 4B:
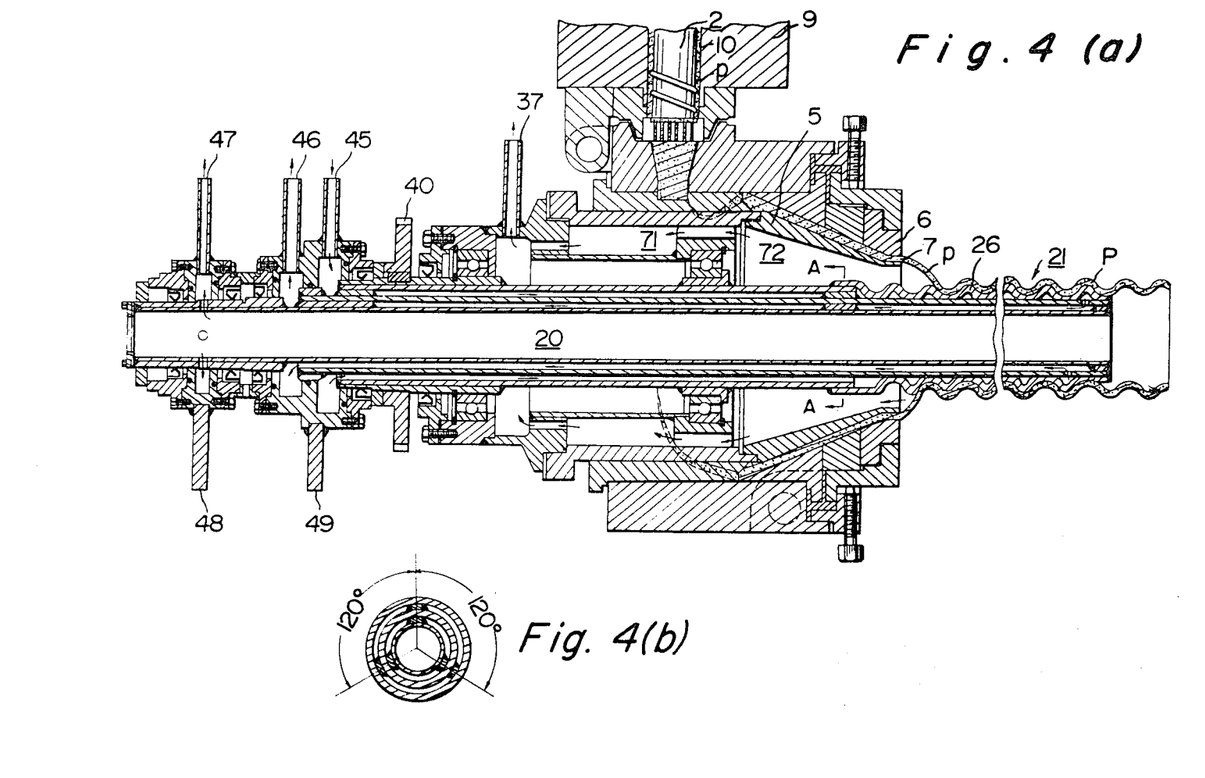

FIGS. 1 to 5 shows two embodiments of inside mandrel system according to the invention. The first embodiment is generally shown in FIG. 4 showing an apparatus to produce helically corrugated plastic pipe in a continuous manner. FIG. 1 and FIG. 2 show extruder assembly and forming cylindrical body of FIG. 4 respectively.

Figures 5A, 5B:
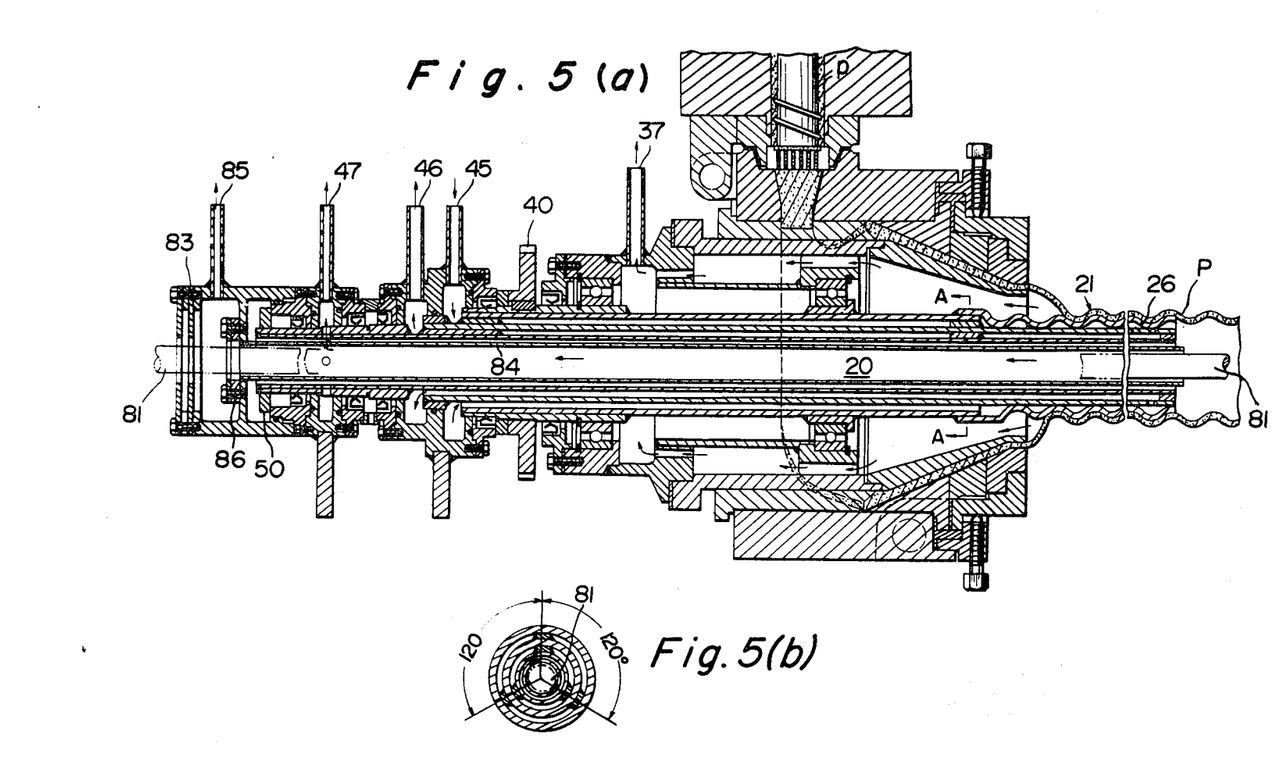

FIG. 5 shows the second embodiment of the inside mandrel system to produce a pipe containing a continuous linear body. The apparatus shown in FIG. 5 is practically combined by two sections shown in FIG. 1 and FIG. 3. Through the figures, the same reference number is used to show similar part.

FIG. 1 shows extruder assembly, generally indicated by 1, of apparatus shown in FIG. 4 and FIG. 5, 2 shows a part of a extrusion screw, 3 shows a cross head inside of which a nipple holder 4 is included. A nipple 5 secured to the nipple holder 4 and a die 6 having predetermined diameter and being secured by a die holder 8 forms annular space 7. The extruder also includes a container 9, a passage 10 for the plastic material and nipple holder case 11. The plastic material is extruded to the cross head 3 in a molten state by means of the extrusion screw 2, moves through passages 12 and 13 to the annular space 7 and leaves the extrusion assembly 1 in a tubular form.

FIG. 2 shows forming section, generally shown as 20, to combine the extrusion assembly 1 shown in FIG. 1, and the section 20 comprises to an end thereof a helically corrugated forming member 21 secured to the section 20. The generally cylindrical forming section comprises in the center portion a double cylindrical members 22, 23, which are separated from each other by spacers 24 and 25 concentrically. A hollow cylindrical member 26 having desired helically corrugated outside configuration and length, made by suitable metal, is secured to one end 26' to an outside surface of the hollow cylindrical member 23, and the other end 26'' to a cylindrical member 27 which is secured to the member 23, concentrically spaced by spacers 28, 28'.

The concentric hollow cylindrical members 22, 23, 27 are disposed rotatably relative to outside casing members 34, 35, 36, 36' by suitable bearings, such as ball bearings 30 and 30'. Evacuating pipe 37, attached to the casing member 35, connected to a vacuum pump, not shown, to evacuate air from an annular cavity 38 formed between the casing member 34, 35, 36, 36' and cylindrical member 27 and from a space formed between the tubular plastic material extruded and the member 26 having helically corrugated forming surface through air passage 39. The detailed explanation will be given hereinafter in connection to operation of the apparatus.

To drive cylindrical rotating members 22, 23, 26, 27, 29 including forming member 26, a gear wheel 40 is secured to a member 29 attached to the outermost cylindrical member 27 by means of a key 41. The gear wheel 40 is driven by a driving means, not shown in FIG. 2. Instead of the gear wheel, a suitable means such as pulley and belt may be used. As the gear wheel 40 is rotated by the driving means, the assembled portion including concentric cylindrical members 22, 23, 26, 27 rotates relative to casing members 34, 35, 36, 36'. The left side edge of member 29' abutting on a fixed member 42, maintains water tight by virtue of a seal ring 43.

A fixed member 42 includes inlet pipe 45 and outlet pipe 46 of suitable cooling fluid such as water. The cooling medium passes through a cavity 56, a passage 57 between the cylindrical members 22, 23, 27, a helical space 58 formed between the helical cylindrical forming member 26 and the member 23, openings 31 at right end of member 23, a passage 59 between the cylindrical members 23, 22 and is exhausted through a cavity 60 to the outlet pipe 46. Suitable O-rings and seal rings, such as ring 44, are provided to prevent leakage from the cooling system.

A fixed member 55 has evacuating pipe 47 to evacuate air in the manufactured corrugated pipe through cavity 55' and through an opening 32 of member 22. Such process is indispensable to production of long pipes but may be omitted for production of short pipes. These fixed members are secured to foundation, not shown, by members 48 and 49 respectively. The rotating portion is longitudinally aligned by positioning ring 50.

These fixed members are connected in series to each other by suitable means such as bolts 63, 64, 65, and cooperate with rotating centrally arranged concentric cylindrical portion, in circulating cooling medium and evacuating air.

FIG. 4 shows an apparatus to produce helically corrugated pipes by means of the "inside mandrel system". The apparatus is a combined assembly of the extrusion assembly 1 shown in FIG. 1 and the forming cylindrical body 20 shown in FIG. 2, above explained in detail.

As shown in FIG. 4, molten plastic material p is extruded by the extrusion screw 2, moves through passage 10, passages 12 and 13, the annular space 7 between the nipple 5 and the die 6, to form pipe on the rotating helically corrugated forming member 26. The space formed by the plastic body P and the forming member 26 is evacuated from the pipe 37 through the air passage 39, and through spaces 71 and 72 formed between the nipple holder and the forming cylindrical body 20 so that the tubular formed molten plastic material is contracted on the helically corrugated forming member 26 to form a desired corrugated pipe conforming to the configuration of the forming member. Simultaneously the plastic material is cooled and hardened by the cooling medium flowing inside the forming body 20 also by cooling by air or suitable fluid from outside surface of the helically corrugated plastic pipe and also is displaced to right hand side of the figure by virtue of rotating helical forming member 26 to produce helically corrugated plastic pipe.

FIG. 5a shows another embodiment of the invention to produce a corrugated pipe of thermoplastic material to manufacture a plastic duct containing a continuous linear body.

The apparatus shown in FIG. 5 comprises two sections shown in FIG. 1 and FIG. 3. The forming body shown in FIG. 3 includes the same principle and construction as that of FIG. 2, and the only difference is a core cable introducing portion shown to left end of FIG. 3, so that only the portion will be explained to indicate the whole operation of the forming body.

As shown in FIG. 3 and FIG. 5, the apparatus comprises a continuous linear body introducing means provided with hollow pipe 84 of substantially the same length of the forming cylindrical body 20 and with a fixed member 82 secured to the rear end of the forming cylindrical body by appropriate means, such as a screw. A continuous linear body 81, such as electric cable is introduced in the hollow pipe 84 inserted in the forming cylindrical body 20 through central openings of packing means 86, 83 secured to fixed member 82. A pipe 85 secured to the fixed member 82 is connected to the evacuating means (not shown) to evacuate the space of the fixed member 82 to prevent leakage of air into the forming cylindrical body 20.

The operation of the apparatus shown in FIG. 5 is similar to that of shown in FIG. 4, so that a corrugated plastic pipe involving a continuous linear body can be produced in a continuous manner, when such body is introduced into the pipe at the same speed of the corrugated plastic pipe.

Figure 6:
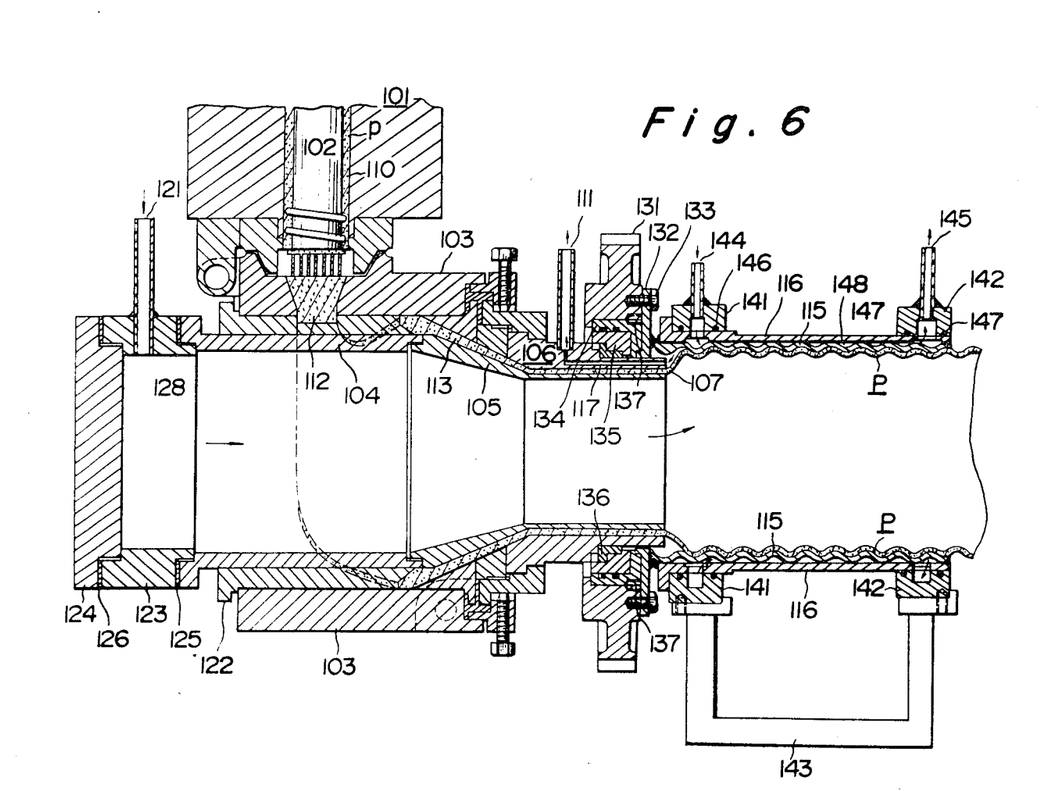
FIG. 6 is a longitudinal sectional view of another embodiment according to outside mandrel system associated with production of a corrugated plastic pipe producing apparatus by outside mandrel system.
Figure 7:
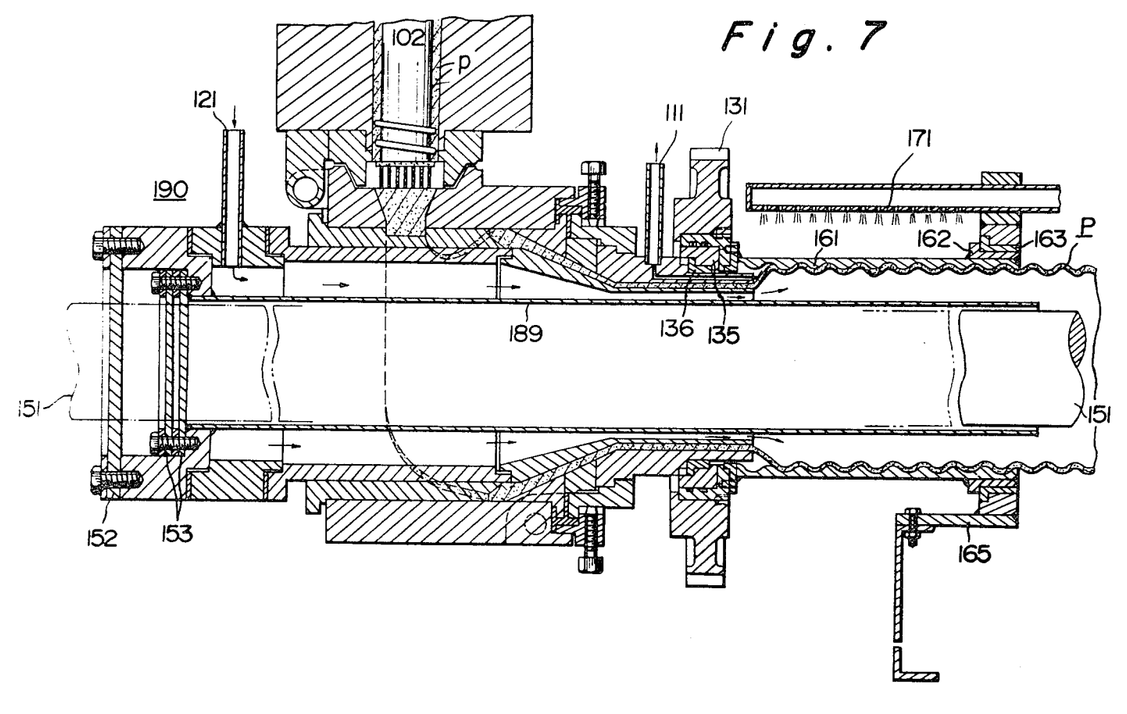
FIG. 7 is similar to the apparatus shown in FIG. 6, but to produce a pipe containing a continuous linear body.

FIG. 6 and FIG. 7 show two embodiments of apparatus of outside mandrel system, according to the invention, to manufacture respectively a helically corrugated plastic pipe, and such pipe containing a continuous linear body. As shown in FIG. 6, the apparatus comprises an extruder 101 having screw 102 to extrude molten thermoplastic material p. The plastic material p is extruded through an annular space 107 in a tubular form though passages 110, 112 and 113. The annular space 107 is defined by a nipple 105 screwed to a nipple holder 104 and a die 106 secured to a cross head 103 by a die holder. An evacuating pipe 111 is secured to the die 106 to evacuate, through a fluid passage 117, a space between the extruded hot plastic tube P and a rotatable cylindrical member 115 having desired helically corrugated inside surface. A fluid pressure supply pipe 121 is secured to the left end of the apparatus to apply a required pressure, so that the hot plastic tube P may expand and conform to the helically corrugated configuration of the forming member 115 to form faithfully corrugated formed pipe. The nipple holder 104 is carried by an outside nipple holder 122, and a member 123 having the compressed fluid supply pipe 121 is screwed to the rear end of the nipple holder 104 and closed by a cover 124, and each connecting portion has packings 125,126, respectively to prevent leakage.

The rotatable cylindrical member 115 comprises a power transmission means such as a gear wheel 131 connected to a driving means (not shown). The gear wheel 131 secured by bolts 137 to a member 134 having O-rings 138 is supported by a bearing 135 on an insulating member 136. The gear wheel 131 of the embodiment shown in FIG. 6 is secured to a member 132 which is welded to the rotatable cylindrical member 115 by means of bolts 133, so that the member 115 is rotatably driven by the driving means through the gear wheel 131. A cylindrical body 116 is secured to outer surface of the member 115 and forms a halical jacket 148 to pass cooling medium between the body 116 and the member 115. Outside surface of the cylindrical body 116 is rotatably supported by members 141, 142 which are fixed by a supporting frame 143 secured to the foundation of the apparatus. The supporting members 141, 142 include a cooling medium supply pipe 144 and a exhaust pipe 145 respectively to circulate cooling medium to the helical jacket 148. O-rings 146 and 147 are provided to prevent leakage of cooling medium between relatively rotating parts 116 and 141 or 142.

Operation of the apparatus shown in FIG. 6 is such that, moleten thermoplastic material p is extruded by the extruder 101, fluid pressure is applied to the bore surface of the plastic material as shown by arrow 128 from the pressure supply pipe 12 and air is evacuated from the space between the plastic tube P and the rotating cylindrical member 115 through the evacuation pipe 111; so that the plastic material p is expanded to the surface of the rotating forming cylindrical member 115, formed into helically corrugated pipe, driven forward by rotating helical pitch surface of the member 115 and cooled and solidified by the forming surface cooled by water circulating in the jacket 148. Consequently, helically corrugated pipe is produced in a continuous manner.

The apparatus shown in FIG. 7 is a modified embodiment of that shown in FIG. 6, to manufacture a helically corrugated plastic duct containing a continuous linear body 151 such as an electric cable. The only difference lies in providing a continuous linear body introducing means 190 having a hollow pipe 189 long enough to reach the right end of a forming cylindrical body 161 and having air seal means 152, 153 instead of the cover 124.

Further, the cooling means shown in FIG. 7 comprises spray means 171 to cool directly the outer surface of a single-layer corrugated forming body 161 having a member 162 supported by a bearing 163.

Operation of the apparatus shown in FIG. 7 is similar to that of FIG. 6, a corrugated pipe containing continuous linear bodies can be produced in a continuous manner.

Plastic corrugated pipes have wide availability because of the various superior characteristics, consequently, different characteristics are required according to different uses. Although plastic pipes considerably lower mechanical properties compared with metal pipes, the superior characteristics such as corrosion resistance, chemical resistance, electric insulation and light weight of the plastic pipes will be capable of wide applications if the mechanical properties are improved. By elaborate experiments and tests on helically corrugated plastic pipes manufactured by the above mentioned method and apparatus, the inventors succeeded in specifying the corrugation structure of the corrugated plastic pipe having flexural rigidity not more than 30 kg-m² and flattening strength of 1 ton/meter or over at 20 percent deformation, without adversely affecting the superior characteristics of plastic pipes. The corrugated plastic pipe of the specified structure can easily be manufactured under this invention.

Figure 8:
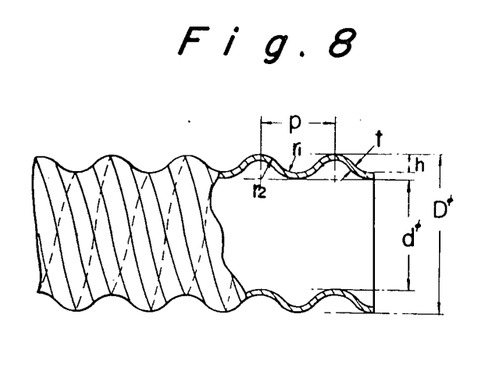
FIG. 8 and FIG. 9 show two embodiments of helically corrugated plastic pipes, according to the invention, having high flattening strength maintaining desired flexibility.
Figure 9:
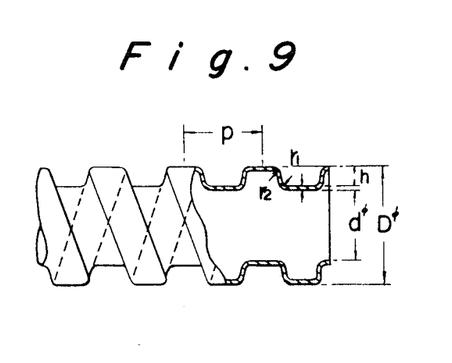

FIG. 8 and FIG. 9 show two embodiments of the helically corrugated plastic pipes having the above mentioned high flexibility and flattening strength. The following reference characters in the figures designate the following dimensions, and are used hereafter in the figures and explanations, in which:

D : outside diameter in millimeter
d : inside diameter in millimeter
h : height of corrugation in millimeter t : wall thickness in millimeter
p : pitch of helix in millimeter
r , r : radius of ridge and valley in millimeter, respectively.

The corrugated plastic pipes having the characteristics above mentioned, must have dimensional construction to satisfy following conditions, according to the invention. The corrugated form may have any suitable form as continuous circular arc as shown in FIG. 8, sine curve, or rectangular corrugation having small roundings as shown in FIG. 9, except sharp edged corrugation. Corrugated pipes which do not satisfy the following conditions include disadvantages of inferior flexibility or inferior flattening strength.

Conditions in case of required D are as follows:-
1. corrugation height h must satisfy the following inequality
$$E\ h/D \geq 3.75\ hg/mm^2,$$
E : Young's Modulus of plastic material $kg/mm^2$,
and
2. wall thickness t must satisfy the following inequality
$$1 \leq t \leq 5\ mm,$$
and
3. pitch p must satisfy the following inequality
$$1 \leq p/h \leq 5\ mm$$

Some practical examples will be shown as to the helically corrugated pipes manufactured by the apparatus according to the invention.

EXAMPLE 1

A helically corrugated plastic pipe was manufactured by the apparatus of the inside mandrel system shown in FIG. 4, the properties were as follows:

Material : Polyethylene from medium pressure polymerization process
Specific weight : 0.95
Pipe dimensions : (continuous circular arc)
D : 90 mm
d : 67 mm
t : 2.5 mm
p : 24 mm
h : 9 mm Mechanical properties:
Flattening strength at 20 percent deformation: 1.6 ton/m
Flexibility (EI): 4 kg-m²
EI means flexural rigidity

EXAMPLE 2

Pipe manufacture : Inside mandrel system
Material : Flame resistant polyethylene
Specific weight : 1.05

Composition:
Polyethylene from medium pressure polymerization process (MI = 0.3)    70 percent
Antimony oxide    10 percent
Perchloropentacyclodecane    20 percent Pipe dimensions: (continuous circular arc)
D : 163 mm
d : 127 mm
t : 4 mm
p : 40 mm
h : 14 mm Mechanical properties:
Flattening strength at 20 percent deformation: 1.3 ton/m
Flexibility (EI): 18 kg-m²

EXAMPLE 3

Pipe manufacture : Inside mandrel system
Material : Rigid polyvinyl chloride
Pipe dimensions : (continuous circular arc)
D : 68 mm
d : 54 mm
t : 2 mm
p : 20 mm
h : 5 mm Mechanical properties:
Flattening strength at 20 percent deformation: 2.0 ton/m
Flexibility (EI): 12 kg-m²

EXAMPLE 4

Pipe manufacture: Inside mandrel system

Material: Elastomeric vinyl compound
Composition:
Geon 101 EP    100 p.h.r.
D.O.P.    50 p.h.r.
Tribasic lead sulfate    5 p.h.r.
Dibasic lead stearate    1 p.h.r.

Pipe dimensions :
D : 90 mm
d : 67 mm
t : 2.5 mm
p : 24 mm
h : 9 mm

Mechanical properties:
Flattening strength: 0.1 ton/m
Flexibility (EI): 0.25 kg-m²

EXAMPLE 5

Pipe manufacture : Outside mandrel system
Material : Polyethylene from medium pressure polymerization process (MI = 0.3)
Specific weight : 0.95
Pipe dimensions:(continuous circular arc)
D : 136 mm
d : 102 mm
t : 3 mm
p : 35 mm
h : 14 mm Mechanical properties:
Flattening strength: 1.7 ton/m
Flexibility (EI): 16 kg-m²

EXAMPLE 6

Pipe manufacture : Inside mandrel system
Material : Poly-4,4'-dihydroxy-diphenyl-2,2'-propanecarbonate
Pipe dimensions : (continuous circular arc)
D : 89 mm
d : 67 mm
t : 2.0 mm
p : 24 mm
h : 9 mm Mechanical properties:
Flattening strength at 20 percent deformation: 5.8 ton/m
Flexibility (EI): 29 kg-m²

EXAMPLE 7

Pipe manufacture : Inside mandrel system
Material : Polyethylene from medium pressure polymerization process
Specific weight : 0.95
Pipe dimensions : (continuous circular arc)
D : 173 mm
d : 127 mm
t : 6 mm
p : 47 mm
h 17 mm Mechanical properties:
Flattening strength: 1.5 ton/m
Flexibility (EI): 43.3 kg-m²

EXAMPLE 8

Pipe manufacture : Outside mandrel system
Material : Polyethylene from medium pressure polymerization process
Specific weight : 0.95
Pipe dimensions : (continuous circular arc)
$D$ : 80 mm
$d$ : 67 mm
$t$ : 2.5 mm
$p$ : 24 mm
$h$ : 4 mm Mechanical properties:
    Flattening strength:    0.75 ton/m
    Flexibility (EI):    12 kg-m$^2$

What we claim is:

1. An apparatus for manufacture of helically corrugated plastic pipes by extrusion, comprising a forming cylindrical body provided with a rotation transmitting member, a cylindrical member having a smooth straight cylindrical member with a helically corrugated outer surface over the outside of a multiple layered cylindrical member leaving a space serving as a passage for a cooling medium, said multiple layered member having pipe members arranged concentri-cally and secured within each other leaving a space between them also to serve a passage for the cooling medium and having a hollow pipe innermost to serve as an evacuating passage, with one end connected to an evacuating means, said rotation transmitting member secure to the smooth straight member of the cylindrical body and connected to a driving source, another evacuating passage formed between the nipple holder of an extruder and said cylindrical body and connected to an evacuating means, cooling medium supply and exhaust means connected to said cooling medium passages in the cylindrical body, and said forming cylindrical body inserted in the nipple and a die arranged in a cross head of the extruder to protrude a major portion of the helically corrugated surface forwardly from the die.

2. An apparatus according to claim 1 including a linear body introducing means comprising an introducing pipe secured in the hollow pipe innermost of the forming cylindrical body, extending from one end of the forming cylindrical body and having seal means to maintain conditions in the hollow pipe despite continuous passing of the linear body.

3. An apparatus for manufacture of helically corrugated plastic pipes by extruding, comprising a rotation transmitting member rotatably mounted on a sleeve which is secured through a heat insulating material on a forming die secured to a cross head of an extruder, a cylindrical member which is supported by bearings and connected to one side of said rotation transmission member said cylindrical member having inner surface helically corrugated to a desired length, an evacuating pipe secured to the forming die to evacuate a space between the extruded hot plastic pipe and said cylindrical member, and a fluid pressure supply pipe secured to the one end of the apparatus to apply a fluid pressure which is sufficient to conform the hot plastic pipe to the inner helically corrugated configuration of the cylindrical member.

4. An apparatus for manufacture of helically corrugated plastic pipes by extruding, comprising a forming die secured to a cross head of an extruder, a cylindrical member which is supported by bearings, connected concentrically to the die through a heat insulating material, and which has an inner surface helically corrugated and forming a continuous inner surface to the forward edge of the die, a rotation transmitting member secured to the outer surface of the cylindrical member, an evacuating pipe secured to the forming die to evacuate a space between the extruded hot plastic pipe and said cylindrical member, and a fluid pressure supply pipe secured to the rear end of the apparatus to apply a fluid pressure which is sufficient to conform the hot plastic pipe to the inner helically corrugated configuration of the cylindrical member.

5. An apparatus according to claim 3 including a linear body introducing means comprising an introducing pipe which is long enough to reach the foremost end of the rotating cylindrical body and is secured to the rear end of nipple holder of the extruder with seal means to maintain conditions in hollow portion despite continuous passing of the linear body.

* * * * *